(12) United States Patent
Batisse et al.

(10) Patent No.: US 12,005,383 B2
(45) Date of Patent: Jun. 11, 2024

(54) METHOD FOR FLUORINATING A FILTER FOR A PIPETTE TIP, PIPETTE TIP, ASSOCIATED PRODUCTION METHOD AND PIPETTE

(71) Applicants: GILSON SAS, Villiers-le-Bel (FR); UNIVERSITE CLERMONT AUVERGNE, Clermont-Ferrand (FR); CENTRE NATIONAL DE LA RECHERCHE SCIENTIFIQUE, Paris (FR); SIGMA CLERMONT, Aubiere (FR)

(72) Inventors: Nicolas Batisse, Perignat les Sarlieve (FR); Marc Dubois, Clermont-Ferrand (FR); Jérémy Peyroux, Ussel (FR); Béatrice Guieu Presle, Deuil-la-Barre (FR)

(73) Assignees: GILSON SAS, Villiers-le-Bel (FR); UNIVERSITE CLERMONT AUVERGNE, Clermont-Ferrand (FR); SIGMA CLERMONT, Aubiere (FR); CENTRE NATIONAL DE LA RECHERCHE, Paris (FR)

( * ) Notice: Subject to any disclaimer, the term of this patent is extended or adjusted under 35 U.S.C. 154(b) by 903 days.

(21) Appl. No.: 16/969,288

(22) PCT Filed: Feb. 18, 2019

(86) PCT No.: PCT/FR2019/050359
§ 371 (c)(1),
(2) Date: Aug. 12, 2020

(87) PCT Pub. No.: WO2019/162602
PCT Pub. Date: Aug. 29, 2019

(65) Prior Publication Data
US 2021/0008478 A1    Jan. 14, 2021

(30) Foreign Application Priority Data
Feb. 20, 2018 (FR) .................................... 1851441

(51) Int. Cl.
B01D 39/16 (2006.01)
B01L 3/02 (2006.01)
C08L 23/28 (2006.01)

(52) U.S. Cl.
CPC ........ *B01D 39/1692* (2013.01); *B01L 3/0217* (2013.01); *C08L 23/283* (2013.01);
(Continued)

(58) Field of Classification Search
None
See application file for complete search history.

(56) References Cited

U.S. PATENT DOCUMENTS 4,491,653 A * 1/1985 McGinniss .............. C08J 7/126
525/509
2004/0028890 A1   2/2004 Yao
(Continued)

FOREIGN PATENT DOCUMENTS

CN   103402642 A   11/2013
CN   107224875 A   10/2017
(Continued)

OTHER PUBLICATIONS

Search Report for French application No. 1851441 dated Sep. 27, 2018.
(Continued)

*Primary Examiner* — Benjamin M Kurtz
(74) *Attorney, Agent, or Firm* — Pearne & Gordon LLP

(57) ABSTRACT

A method for fluorinating a filter for a pipette tip, the filter being made of a solid porous structure made of polyolefin. The method comprises the following steps: (a) placing the
(Continued)

filter in an enclosure, (b) creating a vacuum in the enclosure, and (c) bringing the filter into contact with a fluorination agent injected into the enclosure in a gaseous state, the fluorination agent being made up of difluorine $F_2$, the difluorine $F_2$ being injected into the enclosure at a partial pressure between 100 Pa and 10000 Pa and step (c) being done at a temperature between 0° C. and 100° C. A pipette tip comprising a filter modified by the fluorination method, a method for producing such a tip, as well as a withdrawing pipette equipped with such a tip.

22 Claims, 3 Drawing Sheets

(52) U.S. Cl.
CPC .. *B01D 2239/0428* (2013.01); *B01D 2239/10* (2013.01); *B01L 2300/0681* (2013.01)

(56) References Cited

U.S. PATENT DOCUMENTS

| 2004/0213918 | A1 | 10/2004 | Mikhael et al. |
| 2012/0009100 | A1 | 1/2012 | Kirste et al. |
| 2017/0137589 | A1* | 5/2017 | Garza .................. B01D 71/32 |
| 2019/0105613 | A1* | 4/2019 | Garza ................ B01D 67/0097 |

FOREIGN PATENT DOCUMENTS

| EP | 0631817 A1 | 1/1995 |
| JP | S61-266442 A | 11/1986 |
| JP | 2004-237142 A | 8/2004 |
| WO | 2012121879 A1 | 9/2012 |

OTHER PUBLICATIONS

International Search Report for PCT/FR2019/050359 dated May 17, 2019.

* cited by examiner

METHOD FOR FLUORINATING A FILTER FOR A PIPETTE TIP, PIPETTE TIP, ASSOCIATED PRODUCTION METHOD AND PIPETTE

CROSS-REFERENCE TO RELATED APPLICATIONS

This is a National Stage application of PCT international application PCT/FR2019/050359, filed on Feb. 18, 2019, which claims the priority of French Patent Application No. 1851441, filed Feb. 20, 2018, both of which are incorporated herein by reference in their entirety.

TECHNICAL FIELD

The present invention relates to a method for fluorinating a filter formed by a porous solid polyolefin structure, this filter being more particularly intended to equip a pipette tip.

The present invention also relates to a device comprising a filter modified by the fluorination method mentioned above and, more particularly, to a pipette tip comprising such a filter, to a sampling pipette equipped with such a tip, as well as to a method for producing a pipette tip comprising a fluorinated filter.

PRIOR ART

A pipette is an item of laboratory equipment routinely used in analytical chemistry and in molecular biology.

This device operates under the action of a piston and makes it possible to aspirate or dispense the sampled volumes with great precision. A wheel makes it possible to calibrate the volumes to be sampled by modulating the air column disposed inside the device.

A pipette is conventionally equipped, at the lower end thereof, with a tip, also known as a pipette cone. Such a tip is a removable element intended to collect the sample taken. It is conventionally made of polypropylene and may, according to the nature of the samples to be taken, be stored in a sterile packaging.

To limit the potential contamination of the inner and/or outer surface of the lower part of the pipette by the sample taken and/or the potential contamination of the sample by a prior contamination present on the inner and/or outer surface of the lower part of the pipette, the tips are equipped with a filter which has both a porous solid structure, to enable the passage of air, but also hydrophobic properties, so as to prevent the rise of all or some of the samples into the body of the pipette.

Several pipette tip filter structures simultaneously having a porous solid structure and hydrophobic properties are currently proposed.

Document EP 0 631 817 A1, referenced [1] hereinafter in the present description, describes a pipette tip equipped with a filter formed by a porous solid structure which may be made of polyethylene or of polytetrafluoroethylene (PTFE). While this fluorocarbon polymer indeed imparts superior hydrophobic properties to the filter than polyethylene, PTFE remains nonetheless a substantially more expensive polymer than polyethylene. Moreover, the industrial processing of PTFE to obtain a porous solid structure is complex. To remedy these drawbacks, the document [1] also proposes increasing the hydrophobicity of filters made of porous polyethylene by treating them with a silicone or by impregnating them with PTFE.

Document US 2004/0028890 A1, referenced [2], describes hydrophobic and/or oleophobic porous materials suitable for use as pipette tip filters. These materials comprise a sintered porous thermoplastic substrate and a surface treatment material. This surface treatment material may be disposed outside the porous substrate, inside the latter, or indeed inside as well as outside this porous substrate. The thermoplastic substrate may be polyolefin, nylon, polycarbonate or polyethersulfone. When it coats, at least in part, the thermoplastic substrate, the surface treatment material comprises high-molecular-weight fluorinated compounds such as fluorinated polyacrylates, polymethacrylates and/or acrylic polyesters. When it is disposed, at least in part, in the thermoplastic substrate, the surface treatment material comprises low-molecular-weight fluorinated compounds such as fluorinated urethanes, allophanates, oxazolidones and/or piperazines. The hydrophobic and/or oleophobic porous material may also be obtained by sintering thermoplastic particles coated with the surface treatment material comprising low-molecular-weight fluorinated compounds.

Document US 2012/0009100 A1, referenced [3], describes a pipette tip which may comprise a filter made of polypropylene, of polyethylene or formed by a fibre entanglement. This filter is rendered partially or entirely hydrophobic by applying a hydrophobic coating obtained using a wetting solution which, after evaporating the solvent, makes it possible to impart surface roughness to the filter. The wetting solution comprises a copolymer of ethylene and propylene dissolved in a xylol-based solvent.

Documents [1] to [3] mentioned above therefore propose reinforcing the hydrophobic properties of the filter of a pipette tip, particularly when the filter is made of polyolefin, by producing a hydrophobic coating at the level of the surface of the porous solid structure of the filter, or even in the porous structure of the filter per se.

However, producing such a hydrophobic coating on the surface or in the porous solid structure of the pipette tip filters consists of an addition of material. Yet, besides making the methods for producing the associated filters more burdensome, this addition of material creates interfaces between the porous solid structure and the coating, with the potential risk of subsequent delamination at these interfaces.

Furthermore, whether this hydrophobic coating is located on the surface or in the porous structure forming the filter, there is still a non-negligible risk of release of the molecules forming this hydrophobic coating into the samples, in the event that these samples would come into contact with the filter. Such a release may prove to be particularly problematic: by way of example, a porous polyethylene filter treated with a silicone, as described in document [1], may release silicone, which is a compound known as a pollutant agent in analytical apparatuses and, hence, analytical spectra.

The aim of the invention is therefore to overcome the drawbacks of the prior art and to provide a pipette tip comprising a filter formed by a porous solid polyolefin structure, this filter being characterized by remarkable hydrophobic properties, without any risk of delamination and/or of release of molecules should the filter come into contact with a sample.

A further aim of the invention consists of providing a treatment method which makes it possible to impart these remarkable hydrophobic properties to the filter, this method comprising a limited number of steps and the industrial cost of which is limited. This treatment method must, furthermore, be suitable for being readily integrated into current methods for producing polyolefin filters.

DESCRIPTION OF THE INVENTION

The aims described above are achieved, firstly, by a method for fluorinating a pipette tip filter, this filter being formed by a porous solid polyolefin structure.

According to the invention, this fluorination method comprises the following steps:

(a) placing the filter in an enclosure,
(b) creating a vacuum in the enclosure,
(c) contacting the filter with a fluorination agent introduced in the gaseous state into the enclosure, and, optionally,
(d) removing the by-products formed during step (c), this fluorination agent consisting of difluorine $F_2$, the difluorine $F_2$ being introduced into the enclosure at a partial pressure between 100 Pa and 10000 Pa, step (c) being conducted at a temperature between 0° C. and 100° C.

The Inventors observed that implementing steps (a) to (c), or (a) to (d), combining particularly the introduction, into an enclosure under vacuum, of difluorine $F_2$ as sole fluorination agent, at a partial pressure between 100 Pa and 10 000 Pa and under conditions such that the temperature, in the enclosure, is between 0° C. and 100° C., enables the rupture of C—H bonds of the polyolefin for the benefit of the formation of C—F bonds, and thus replacing, by fluorine atoms, at least some, or all, of the hydrogen atoms of the polyolefin which are located at the level of the outer surface of the porous solid structure forming the filter.

In doing so, the hydrophobic properties of the filter are not imparted thereto by an addition of material and/or molecules, as it is the case in each of documents [1] to [3], but by the formation of a continuous gradient of fluorine atoms which replace the hydrogen atoms of the polyolefin, this continuous gradient of fluorine atoms fitting within the thickness of the porous solid structure, in a decreasing amount from the outer surface towards the core of the porous solid polyolefin structure.

The fluorination method according to the invention is relatively easy to implement industrially and at a controlled cost, in the sense that only a small amount of fluorine is required to fluorinate a large amount of polyolefin filters.

The bonds formed between the fluorine atoms from the fluorination agent and the carbon atoms of the polyolefin are covalent bonds. Since the C—F covalent bonds are characterized by a binding energy of 490 kJ·mol$^{-1}$ which is greater than the binding energy of the C—H covalent bonds which is established between 402 kJ·mol$^{-1}$ and 414 kJ·mol$^{-1}$, these C—F bonds are particularly stable. Consequently, should the filter treated with the fluorination method according to the invention come into contact with a sample taken, there is no risk of delamination and/or of contamination of this sample by releasing fluorine atoms therein.

In addition, the implementation of the fluorination method according to the invention makes it possible to retain the initial morphology presented by the porous solid polyolefin structure, in particular the initial porosity thereof, all the more since the atomic radius of fluorine and hydrogen atoms (of 50 pm and of 25 pm, respectively), on one hand, and the length of C—F and C—H covalent bonds (of 1.35 Å and of 1.07 Å), on the other, are of the same order of magnitude.

The fluorination method according to the invention therefore makes it possible to carry out fluorination, by substituting fluorine atoms for hydrogen atoms of the polyolefin forming the porous solid structure of the pipette tip filter.

The fluorination method according to the invention also has the advantage of being suitable for being applied to any type of polyolefin filters, regardless of the forms thereof.

Although there is no actual limitation as to the choice of the polyolefin forming the filter, said polyolefin is more particularly chosen among a polyethylene and a polypropylene.

Advantageously, the polyolefin forming the filter is a polyethylene.

In addition to being easy and quick to carry out, the fluorination method according to the invention only comprises a few steps and furthermore has the advantage of a having a low energy consumption.

The method according to the invention comprises a step (a) consisting in placing the filter in an enclosure with a view to the fluorination thereof. This installation may be manual as well as automated.

After closing the enclosure, a step (b) of evacuating this enclosure is carried out so as to remove the oxygen and water (moisture) present in the volume of the enclosure as well as in the pores of the porous solid polyolefin structure forming the filter. This step (b) makes it possible to prevent the oxyfluorination of the polyolefin which would have an opposite effect to the hydrophobic effect sought.

According to a particular variant, step (b) is carried out so as to reach, in the enclosure, a pressure less than or equal to 100 Pa, advantageously less than or equal to 50 Pa and, preferably, less than or equal to 10 Pa.

According to an advantageous variant of the fluorination method according to the invention, the difluorine $F_2$ is introduced into the enclosure at a partial pressure between 500 Pa and 8000 Pa and, preferably, between 750 Pa and 6000 Pa.

According to another advantageous variant of the fluorination method according to the invention, step (c) of contacting the filter with difluorine is conducted at a temperature, in the enclosure, between 10° C. and 60° C. and, preferably, between 15° C. and 25° C.

According to a variant of the fluorination method according to the invention, step (c) of contacting the filter with difluorine is carried out for a duration between 1 min and 60 min.

In an advantageous variant, this contacting duration may be between 2 min and 45 min, preferably between 5 min and 45 min and, more preferably, between 10 min and 30 min.

The duration of step (c) may indeed be limited, in the sense that remarkable hydrophobic properties are imparted to the polyolefin filter once the fluorine atoms substitute at least partially the hydrogen atoms of the polyolefin which are located at the level of the outer surface of the porous solid structure. Substitution of the fluorine atoms for the hydrogen atoms which would be conducted to the core may obviously be envisaged, but is not necessary: indeed, substituting the fluorine atoms for the hydrogen atoms initially present at the level of the outer surface of the porous solid polyolefin structure is sufficient in itself, the grafting of the fluorine atoms imparting hydrophobic feature to the porous solid structure thus modified by the fluorination method according to the invention.

The Inventors were able to demonstrate that a partial substitution of fluorine atoms for the hydrogen atoms of the polyolefin carried out over a depth less than 2 μm makes it possible to obtain such hydrophobic properties.

According to variant of the fluorination method according to the invention, during step (c) of contacting the filter with difluorine, a number of moles of difluorine greater than or equal to the equivalent number of moles of hydrogen atoms of the polyolefin is introduced.

The equivalent number of moles of hydrogen atoms of the polyolefin is calculated by accounting for the surface area of the porous polyolefin which is gas-accessible, modulated by the density thereof and for a given difluorine diffusion depth.

Since the porosity of the polyolefin may be variable according to the preparation method thereof, a determination of the gas-accessible surface area is required: it may be based on data from microscopy or by a volumetric technique such as gas adsorption or helium pycnometry. This gas-accessible surface area value is then modulated by the diffusion depth of difluorine which may be estimated using a microscopic or spectroscopic technique according to the porous structure of the polyolefin; a polyolefin volume suitable for being exposed to the treatment is thus obtained. The number of moles of hydrogen atoms is then inferred by comparing with the density determined for the same polyolefin but not having a porous structure and of which the number of hydrogen atoms per formula unit is known.

According to an advantageous variant, this number of moles of difluorine is greater than or equal to 5 times and, preferably, to 10 times the equivalent number of moles of hydrogen atoms of the polyolefin.

In view of the particular conditions of partial pressure of the fluorination agent and of temperature implemented and of the choice of fluorination agent, the reaction by-product formed, during step (c) of contacting the filter with difluorine in the gaseous state, is essentially hydrogen fluoride HF. In particular, it should be noted that few volatile perfluorocarbon compounds such as tetrafluoromethane $CF_4$ or indeed hexafluoroethane $C_2F_6$, which are compounds known to substantially modify the porosity of porous solid structures, are formed. In other words, the fluorination method according to the invention does not make the filter lose the initial morphology thereof.

According to a first embodiment, the fluorination method according to the invention may only comprise steps (a) to (c).

According to a second embodiment, the fluorination method according to the invention may also comprise one or more additional steps.

According to a first variant of this second embodiment, the fluorination method according to the invention may advantageously comprise a step (d) of removing the reaction by-products which are formed during step (c) and which are in the gaseous state.

This removal step (d) may be carried out by means of a chemical process, particularly by chemical trapping of the reaction by-products by means of a trap disposed in the enclosure or outside the latter and connected thereto. Such a trap is conventionally formed by a compound (for example, a fluorine salt) or a hygroscopic chemical composition which is chosen so as to only react with the by-products (particularly HF) and not to be degraded by difluorine.

This removal step (d) may also be carried out by means of a physical process, i.e. by direct removal of the gaseous by-products and, in particular, by pumping or by degassing, advantageously by vacuum degassing, these by-products.

Steps (c) and (d) may be carried out concomitantly in order to remove the by-products formed as they are formed, among which hydrogen fluoride HF. This is particularly the case when step (d) of removing the formed by-products is carried out by chemical trapping.

More particularly advantageously, steps (c) and (d) are carried out successively, step (d) of removing the formed by-products being carried out at the end of the contacting step (c).

According to a second variant of this second embodiment, the fluorination method according to the invention may advantageously comprise a step ($e_1$) of creating a vacuum in the enclosure followed by a step ($e_2$) of contacting the filter with dihydrogen or with a mixture comprising dihydrogen, the dihydrogen or the mixture comprising dihydrogen being introduced in the gaseous state into the enclosure.

The implementation of such a step ($e_2$) makes it possible to stabilize the porous solid structure of the filter as obtained by the fluorination method according to the invention. Indeed, contacting the filter with dihydrogen makes it possible to stabilize any so-called pending or free bonds, which could be formed during step (c), following the rupture of C—H bonds and the lack of replacement, on these ruptured bonds, of the hydrogen atom by a fluorine atom, particularly for steric hindrance reasons. The implementation of step ($e_2$) therefore makes it possible to reform C—H bonds at the level of these pending or free bonds so as to prevent the latter from reacting, for example, with the oxygen from the air on opening the enclosure to form hydroxyl and/or carboxyl bonds which would reduce the hydrophobic properties of the filter.

Steps ($e_1$) of vacuuming and ($e_2$) of contacting the filter with dihydrogen or with a mixture comprising dihydrogen may be implemented whether the fluorination method according to the invention comprises, or on the contrary does not comprise, step (d) of removing the by-products formed during step (c).

These steps ($e_1$) then ($e_2$) are carried out directly after step (c) when the method according to the invention does not comprise step (d) or indeed when this method comprises a step (d) and these steps (c) and (d) are concomitant. In the case where the method according to the invention comprises a step (d) and steps (c) and (d) are not concomitant but are carried out successively, steps ($e_1$) then ($e_2$) are carried out after step (d).

According to a particular variant, step ($e_1$) is carried out under the same conditions as step (b) described above so as to reach, in the enclosure, a pressure less than or equal to 100 Pa, advantageously less than or equal to 50 Pa and, preferably, less than or equal to 10 Pa.

During step ($e_2$), dihydrogen, or the mixture comprising dihydrogen, is introduced in the gaseous state into the enclosure.

According to a particular embodiment, the mixture comprising dihydrogen is a mixture of dihydrogen and nitrogen. In an advantageous variant, the volume percentage of dihydrogen, in the mixture formed by dihydrogen and nitrogen, is greater than or equal to 2% vol and is, preferably, comprised between 5% vol and 20% vol.

According to another embodiment, during step ($e_2$), a number of moles of dihydrogen less than or equal to the number of moles of difluorine introduced into the enclosure during step (c) is introduced.

According to another embodiment, step ($e_2$) of contacting the filter with dihydrogen or with the mixture comprising dihydrogen is carried out for a duration between 10 min and 2 h.

In an advantageous variant, the contacting duration of step ($e_2$) may be between 30 min and 60 min.

According to another embodiment, step ($e_2$) is conducted at a temperature between 0° C. and 200° C. and, preferably, between 20° C. and 80° C.

According to an advantageous variant of the method according to the invention, step (c), during which the replacement of the hydrogen atoms by fluorine atoms takes place, is monitored by infrared spectroscopy.

Indeed, by infrared spectroscopy, it is possible to obtain the absorbance spectra of the different groups which are present during step (c) of contacting the polyolefin filter with difluorine and, more particularly, the —$CH_2$—, —CHF— and —$CF_2$— groups. Thus, tracking the evolution of the ratio (denoted $A_{CH_2}/A_{CF_x}$) of the area of the infrared vibration bands corresponding to the —$CH_2$— groups (denoted $A_{CH_2}$) over the sum of the areas of the infrared vibration bands corresponding to the —CHF— groups (denoted $A_{CHF}$), on the one hand, and to the —$CF_2$— groups (denoted $A_{CF_2}$), on the other hand, the sum of these areas being denoted $A_{CF_x}$ where $A_{CF_x}=A_{CHF}+A_{CF_2}$, makes it possible to track the evolution of the fluorination of the porous solid polyolefin structure forming the filter.

In an advantageous variant of the fluorination method according to the invention, step (c) of contacting the filter with difluorine may be stopped once this area ratio $A_{CH_2}/A_{CF_x}$ reaches a value less than or equal to 15, advantageously less than or equal to 6 and, preferably, less than or equal to 3.

The present invention secondly relates to a method for producing a pipette tip comprising a fluorinated filter.

According to the invention, this method comprises the following steps:
(i) providing a filter formed by a porous solid polyolefin structure,
(ii) fitting the filter in the pipette tip, and
(iii) fluorinating the filter by implementing the fluorination method as defined above.

While, obviously, step (i) of providing the filter is carried out first, steps (ii) and (iii) of the production method may subsequently be carried out in any order.

In other words, this method for producing a pipette tip according to the invention may be carried out according to the step sequences described hereinafter.

According to a first sequence, after step (i), step (ii) of fitting the filter formed by a porous solid polyethylene structure in the tip is carried out, followed by step (iii) of fluorinating this filter placed in the tip.

According to a second sequence, after step (i), step (iii) of fluorinating the filter formed by a porous solid polyethylene structure is carried out, followed by step (ii) of fitting the fluorinated filter in the tip.

Regardless of the sequence selected, step (iii) of fluorinating the filter is carried out by implementing the fluorination method described above, the features relating to steps (a) to (c) as well as to optional steps (d), ($e_1$) and ($e_2$) of this method being taken alone or in combination.

Thus, regardless of the sequence selected, the production method according to the invention makes it possible to obtain a pipette tip equipped with a filter wherein the porous solid structure, initially made of polyolefin, has been modified by replacing at least some of the hydrogen atoms of the polyolefin by fluorine atoms.

As stated above, there is no actual limitation as to the choice of the polyolefin forming the filter. However, the polyolefin is more particularly chosen from a polyethylene and a polypropylene. Advantageously, the polyolefin forming the porous solid structure of the filter is a polyethylene.

The pipette tip may also be made of polyolefin, for example of polypropylene.

The present invention thirdly relates to a pipette tip comprising a filter.

According to the invention, the filter of this pipette tip is formed by a porous solid polyolefin structure, in particular made of polyethylene, wherein fluorine atoms replace hydrogen atoms of the polyolefin by implementing the fluorination method as defined above.

The pipette tip filter according to the invention has remarkable hydrophobic properties. All things considered, even if this filter should be in contact with a sample, the part of the sample which might possibly have filled the pores of the porous solid structure forming the filter may be collected again, without any risk of soiling or contamination, by releasing molecules from the filter.

Furthermore, this filter retaining the morphology thereof before treatment with the fluorination method according to the invention, it can equip any type of pipette tips, without any constraint as to the volume to be sampled.

Such a filter may obviously equip other devices for which protection against moisture, for example, is sought.

By way of examples of such devices, mention may be made of gas sensors and microsensors, the gas optionally being selected from ozone, nitrogen dioxide, oxygen monoxide, ammonia and hydrogen sulphide.

The present invention fourthly relates to a sampling pipette.

According to the invention, this sampling pipette comprises a tip as defined above, i.e. a pipette tip comprising a filter formed by a porous solid polyolefin structure, in particular made of polyethylene, wherein fluorine atoms replace hydrogen atoms of the polyolefin by implementing the fluorination method as defined above.

Such a sampling pipette may be of the "single-channel" type and thus only comprise a single tip fitted to the lower end thereof. It may also be "multi-channel" and thus comprise several tips fitted to the lower end thereof which is suitable for this purpose.

This sampling pipette may be a manually actuated or motorized mechanical pipette or indeed an automated pipette or pipetting automaton (robot).

Further features and advantages of the present invention will emerge on reading the following supplementary description, with reference to FIGS. 1 to 4 appended, which refers to specific embodiments of the invention.

Obviously, these specific embodiments of the invention are merely given by way of illustration of the subject matter of the invention and in no way represent a restriction of this subject matter.

BRIEF DESCRIPTION OF THE DRAWINGS

It is specified that the common elements in FIGS. 1 and 2 are identified with the same reference number.

DETAILED DESCRIPTION OF SPECIFIC EMBODIMENTS

Figure 1:
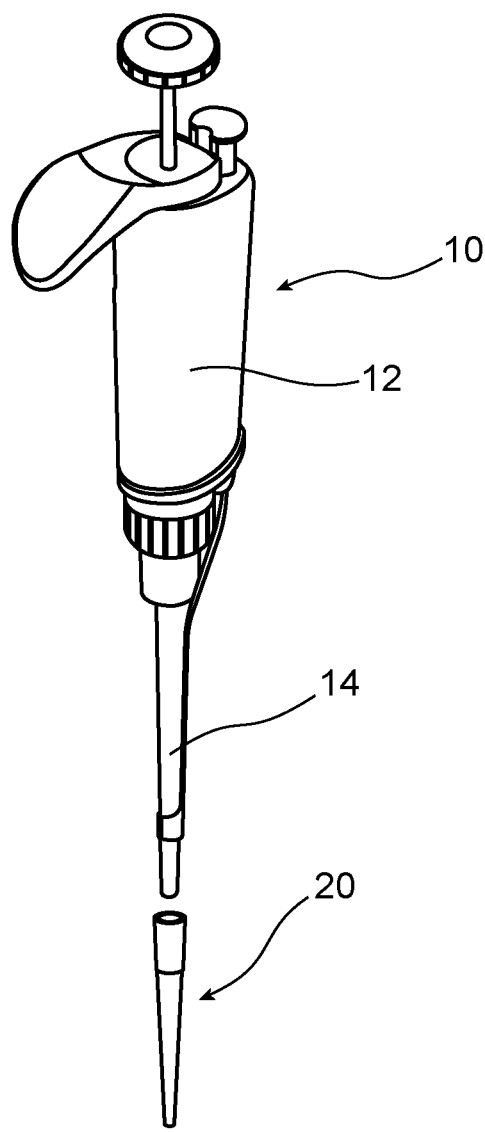
FIG. 1 is a schematic elevation and exploded representation of a sampling pipette at the end of which a pipette tip according to the invention is intended to be fitted.

In FIG. 1, a sampling pipette 10 intended to receive a pipette tip 20 according to the invention has been represented. This sampling pipette 10 may particularly be an air-displacement, manual or motorized pipette.

Figure 2:
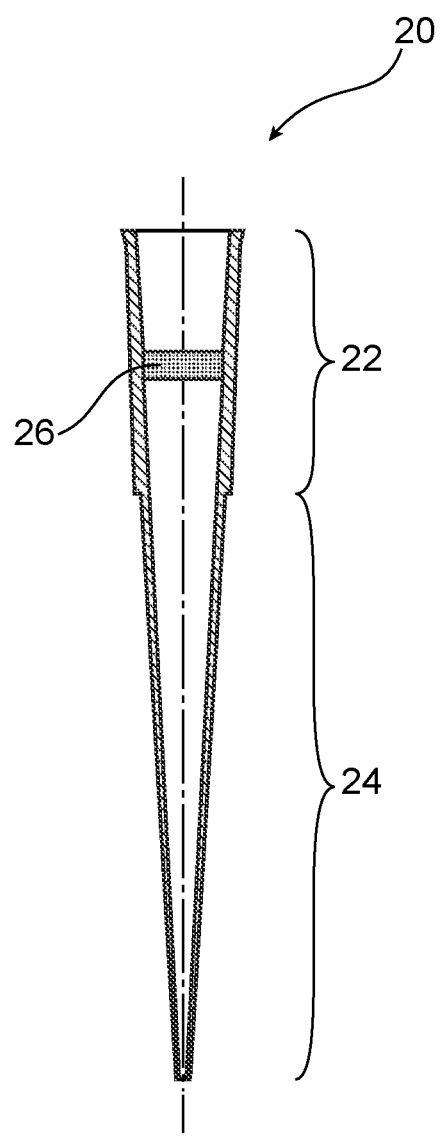
FIG. 2 is a schematic cross-sectional representation of the pipette tip represented in FIG. 1.

This pipette 10 comprises an upper part forming a handle 12 and a lower part 14 intended to receive a tip, or cone, 20 of pipette represented in a longitudinal cross-section in FIG. 2.

In the representation in FIG. 1, a single tip 20 is intended to be attached to the sampling pipette 10, known as a "single-channel" pipette.

Obviously, there is nothing preventing envisaging that several tips may be simultaneously attached to a so-called "multi-channel" sampling pipette (not shown).

With reference to FIG. 2, it is observed that the tip 20 has a tapered shape, which retracts from the upper part 22 thereof to the lower part 24 thereof which corresponds to the part of the tip 20 which is intended to be immersed in the solution to be sampled.

The tip 20 is conventionally made of polyolefin and, more particularly, of polypropylene.

The tip 20 comprises, in the upper part 22 thereof, a radially disposed filter 26. This filter 26 is formed by a porous solid polyolefin structure, preferably made of polyethylene.

This filter 26 has enhanced hydrophobic properties, obtained thanks to the implementation of the fluorination method according to the invention.

The fluorination method according to the invention was conducted under the following operating conditions.

Polyethylene filters were placed in an enclosure. After closing the enclosure, a vacuum of the order of 10 Pa was successively produced, in the same enclosure, before introducing difluorine therein, at different partial pressures, in this instance at 1000 Pa, at 3000 Pa and at 5000 Pa.

The fluorination reactions were conducted at ambient temperature, typically at 20° C., and were monitored by infrared spectroscopy.

Figures 3A, 3B:
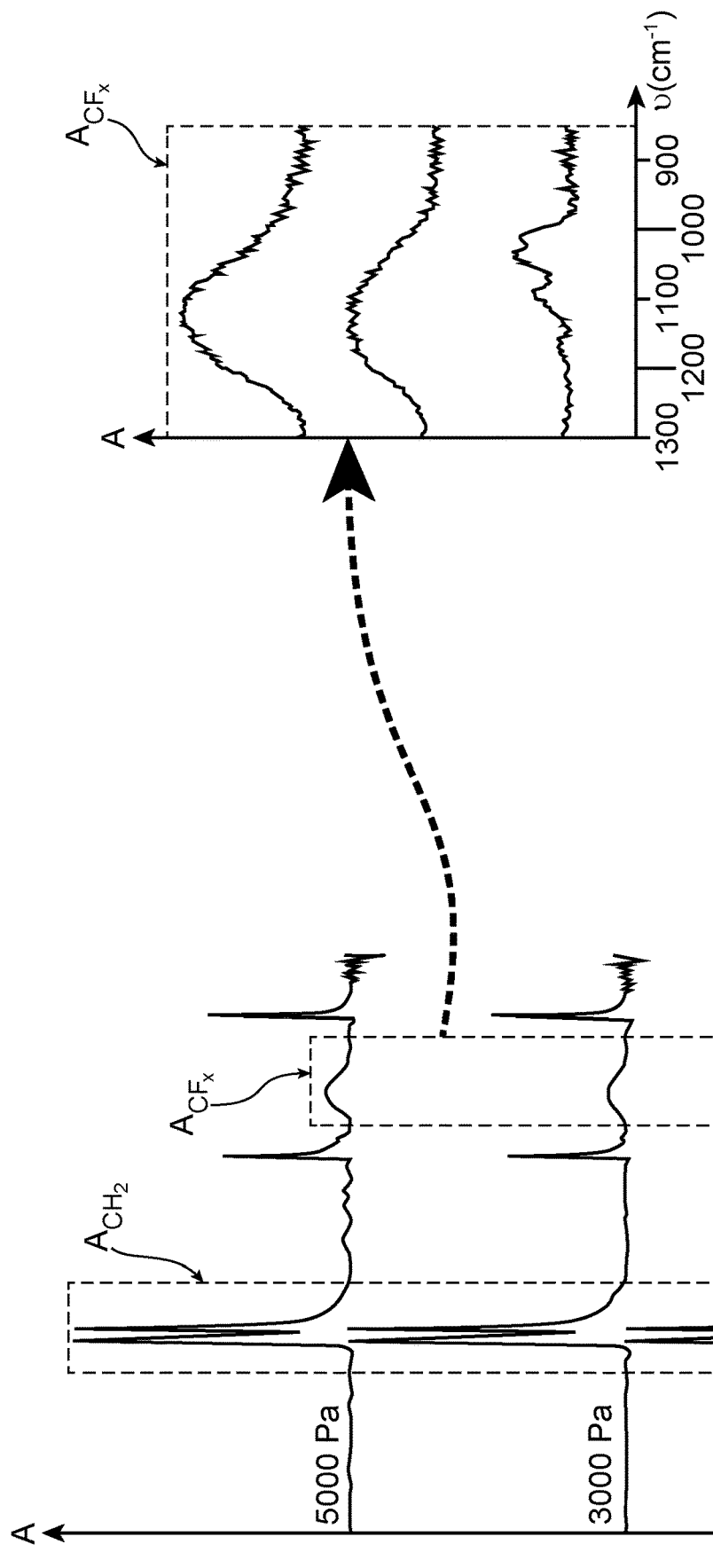
FIG. 3A illustrates the absorbance spectra conveying the evolution of the absorbance (denoted A and expressed without units) as a function of the wavenumber (denoted v and expressed in $cm^{-1}$) as obtained, with the implementation of the method for fluorinating a pipette tip filter according to the invention, this method being carried out at three different partial difluorine pressure values.
FIG. 3B is an enlargement of the total area, denoted $A_{CF_x}$, corresponding to the sum of the area of the infrared vibration bands corresponding to the —CHF— groups and of the area of the infrared vibration bands corresponding to the —$CF_2$— groups.

Reference may be made to FIG. 3A which illustrates the absorbance spectra as obtained, after contacting the filter with difluorine for 30 min, according to the partial difluorine pressure applied.

In FIG. 3A, the infrared vibration bands corresponding to the —CH$_2$— groups are situated in a wavenumber range between 3000 cm$^{-1}$ and 2600 cm$^{-1}$ whereas the infrared vibration bands corresponding to the —CHF— and —CF$_2$— groups are situated in a wavenumber range between 1300 cm$^{-1}$ and 900 cm$^{-1}$.

Table 1 below shows the ratio, denoted $A_{CH_2}/A_{CF_x}$, between:

the area of the infrared vibration bands corresponding to the —CH$_2$— groups, denoted $A_{CH_2}$ in FIG. 3A, and
the sum of the areas of the infrared vibration bands corresponding to the —CHF— and —CF$_2$— groups, denoted $A_{CF_x}$ in FIGS. 3A and 3B.

TABLE 1

| Partial difluorine pressure applied (Pa) | $A_{CH_2}/A_{CF_x}$ |
|---|---|
| 5000 | 2.63 |
| 3000 | 5.38 |
| 1000 | 12.0 |

It is observed that, for the same contacting duration, a replacement rate of hydrogen atoms by fluorine atoms that increases as the partial difluorine pressure increases is obtained.

Figure 4A:
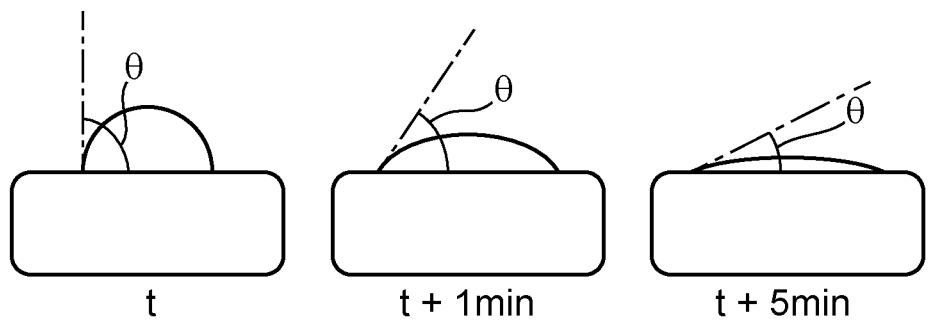
FIG. 4 illustrates the evolution of a drop of water deposited on two polyethylene filters, one not treated (FIG. 4A) and the other treated with the fluorination method according to the invention (FIG. 4B), over a duration of 5 min.
Figure 4B:
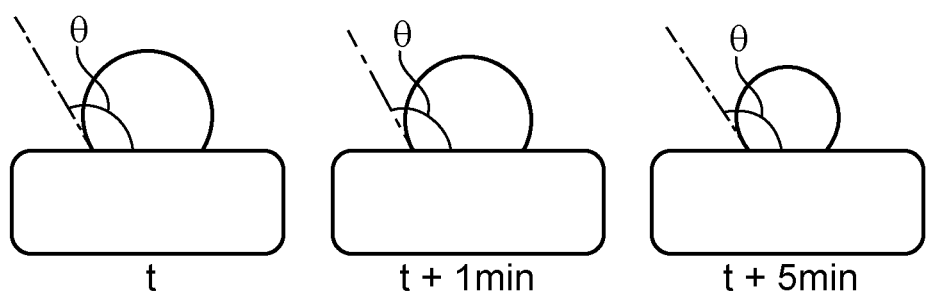

FIG. 4 illustrates the behavior of a drop of water deposited on the surface of two polyethylene filters, the first filter not having been treated (FIG. 4A) and the second filter having been treated by the fluorination method according to the invention described above with reference to FIGS. 3A and 3B and implemented at the partial difluorine pressure of 3000 Pa (FIG. 4B).

With reference to FIG. 4A, it is observed that the contact angle θ, which is of the order of 90° when the drop of water is deposited, declines over time, meaning that the outer surface of the untreated polyethylene filter displays wettability properties and, hence, water penetrates inside the porous structure of this filter under the influence of its own weight.

Conversely, in FIG. 4B, it is observed that the contact angle θ remains at a value greater than 90° for the 5 min of observation, which means that water does not penetrate into the porosity of the polyethylene filter treated with the fluorination method according to the invention. The fluorinated filter therefore retains the hydrophobic properties thereof over the same duration.

BIBLIOGRAPHY

[1] EP 0 631 817 A1
[2] US 2004/0028890 A1
[3] US 2012/0009100 A1

What is claimed is:

1. Method for fluorinating a filter for a pipette tip, this filter being formed by a porous solid polyolefin structure, characterized in that it comprises the following steps:
   (a) placing the filter in an enclosure,
   (b) creating a vacuum in the enclosure, and
   (c) contacting the filter with a fluorination agent introduced in the gaseous state into the enclosure,
in that the fluorination agent consists of difluorine F$_2$, in that the difluorine F$_2$ is introduced into the enclosure at a partial pressure between 100 Pa and 10000 Pa, in that step (c) is conducted at a temperature between 0° C. and 100° C., and further comprising after step (c):
   (e$_1$) creating a vacuum in the enclosure, followed by
   (e$_2$) contacting the filter with dihydrogen or a mixture comprising dihydrogen, the dihydrogen or mixture comprising dihydrogen comprising dihydrogen being introduced in the gaseous state into the enclosure.

2. Fluorination method according to claim 1, wherein the polyolefin is chosen from a polyethylene and a polypropylene.

3. Fluorination method according to claim 2, wherein the polyolefin is polyethylene.

4. Fluorination method according to claim 1, wherein the difluorine F$_2$ is introduced into the enclosure at a partial pressure between 500 Pa and 8000 Pa.

5. Fluorination method according to claim 1, wherein step (c) is conducted at a temperature between 10° C. and 60° C.

6. Fluorination method according to claim 1, wherein step (c) is carried out for a duration between 1 min and 60 min.

7. Fluorination method according to claim 1, wherein, during step (c), a number of moles of difluorine greater than or equal to the equivalent number of moles of hydrogen atoms of the polyolefin is introduced.

8. Fluorination method according to claim 1, wherein the mixture comprises dihydrogen and nitrogen.

9. Fluorination method according to claim 8, wherein the volume percentage of dihydrogen in this mixture is greater than or equal to 2% vol.

10. Fluorination method according to claim 1, wherein, during step ($e_2$), a number of moles of dihydrogen less than or equal to the number of moles of difluorine introduced during step (c) is introduced.

11. Fluorination method according to claim 1, wherein step ($e_2$) is carried out for a duration between 10 min and 2 h.

12. Fluorination method according to claim 1, wherein step ($e_2$) is conducted at a temperature between 0° C. and 200° C.

13. Fluorination method according to claim 1, wherein, during steps (b) and ($e_1$), the pressure in the enclosure is less than or equal to 100 Pa.

14. Fluorination method according to claim 1, wherein step (c) is monitored by infrared spectroscopy.

15. Fluorination method according to claim 14, wherein step (c) is stopped when this ratio $ACH_2/ACF_x$ reaches a value less than or equal to 15.

16. Fluorination method according to claim 14, wherein step (c) is monitored by tracking the evolution of the ratio $ACH_2/ACF_x$ of the area of the infrared vibration bands corresponding to the —$CH_2$ groups over the sum of the areas of the infrared vibration bands corresponding to the —CHF— groups and to the —$CF_2$ groups.

17. Method for producing a pipette tip comprising a fluorinated filter, the method comprising the following steps:
(i) providing a filter formed by a porous solid polyolefin structure,
(ii) fitting the filter in the pipette tip, and
(iii) fluorinating the filter by implementing the fluorination method according to claim 1.

18. Fluorination method according to claim 1, further comprising a step (d) of removing the by-products formed during step (c), steps ($e_1$) and ($e_2$) being performed after step (d).

19. Fluorination method according to claim 18, wherein step (d) is carried out by degassing the by-products during step (c).

20. Fluorination method according to claim 19, wherein step (d) is carried out by vacuum degassing the by-products formed during step (c).

21. Fluorination method according to claim 18, wherein steps (c) and (d) are carried out successively, step (d) of removing the by-products being carried out at the end of step (c).

22. Fluorination method according to claim 18, wherein step (d) is carried out by chemical trapping of the by-products formed during step (c).

* * * * *